(12) United States Patent
Wood et al.

(10) Patent No.: US 8,733,162 B2
(45) Date of Patent: May 27, 2014

(54) RESONANT FLOW SENSOR AND USES AND PRODUCTION METHODS FOR THE SAME

(75) Inventors: Norman Wood, Chippenham (GB); Karin Bauer, Oberhaching (DE); Xaver Riedl, München (DE); Roland Wagner, Feldkirchen-Westerham (DE)

(73) Assignees: Airbus Operations Limited, Bristol (GB); EADS Deutschland GmbH, Ottobrunn (DE)

( * ) Notice: Subject to any disclaimer, the term of this patent is extended or adjusted under 35 U.S.C. 154(b) by 417 days.

(21) Appl. No.: 12/737,376

(22) PCT Filed: Jul. 27, 2009

(86) PCT No.: PCT/GB2009/050930
§ 371 (c)(1),
(2), (4) Date: Jan. 6, 2011

(87) PCT Pub. No.: WO2010/013040
PCT Pub. Date: Feb. 4, 2010

(65) Prior Publication Data
US 2011/0107829 A1 May 12, 2011

(30) Foreign Application Priority Data
Jul. 30, 2008 (DE) .......................... 10 2008 035 423

(51) Int. Cl.
*G01M 9/00* (2006.01)

(52) U.S. Cl.
USPC .......... 73/147; 73/579; 73/861.24; 73/861.18

(58) Field of Classification Search
CPC ...... G01F 7/00; G01F 5/00; G01N 2291/2694
USPC .................... 73/579, 861.18, 861.65, 861.31, 73/861.24, 861.21, 147, 583, 651, 655, 73/657; 29/890; 604/500; 422/68.1; 436/63; 116/264, 265; 702/45
See application file for complete search history.

(56) References Cited

U.S. PATENT DOCUMENTS

| 6,752,020 B1 | 6/2004 | Sobotta | |
|---|---|---|---|
| 2002/0174728 A1* | 11/2002 | Beresford et al. | 73/861 |
| 2006/0058971 A1* | 3/2006 | Logue et al. | 702/45 |

FOREIGN PATENT DOCUMENTS

| DE | 33 37 978 | 5/1985 |
|---|---|---|
| DE | 44 43 665 | 6/1996 |
| WO | WO 95/20769 | 8/1995 |

OTHER PUBLICATIONS

International Search Report for PCT/GB2009/050930, mailed Sep. 22, 2009.

(Continued)

*Primary Examiner* — Hezron E Williams
*Assistant Examiner* — Rodney T Frank
(74) *Attorney, Agent, or Firm* — Nixon & Vanderhye P.C.

(57) ABSTRACT

The invention relates to a flow state sensor (10) for detecting a flow state at a body (16) that may be impinged on by a flow (12). A flow state sensor (10) that is of a simple construction and that is simple to evaluate is characterized in accordance with the invention by at least one frequency detecting device (20) for detecting at least one predefined frequency characteristic of the flow state. The frequency detecting device (20) has at least one oscillation element (22; 22a, 22b, 22c) excitable to resonant oscillatory movement (30) by a flow (12) and having a resonant frequency or natural frequency adapted to the predefined frequency characteristic, especially corresponding to the predefined frequency characteristic. Uses of the flow state sensor (10) in a flow measuring device (62) and in a flow measuring method, and an advantageous production method for the flow state sensor (10) are also proposed.

26 Claims, 3 Drawing Sheets

(56) References Cited

OTHER PUBLICATIONS

Written Opinion of the International Searching Authority for PCT/GB2009/050930, mailed Sep. 22, 2009.

Barrett, R.V., "Transition detection for laminar flow aircraft using microphones beneath the surface of laser drilled suction panels", Proc. Instn. Mech. Engrs., vol. 214, Part G., (Jun. 12, 2000), pp. 145-148.

* cited by examiner

RESONANT FLOW SENSOR AND USES AND PRODUCTION METHODS FOR THE SAME

This application is the U.S. national phase of International Application No. PCT/GB2009/050930 filed 27 Jul. 2009, which designated the U.S. and claims priority to DE Application No. 10 2008 035 423.6 filed 30 Jul. 2008, the entire contents of each of which are hereby incorporated by reference.

FIELD OF THE INVENTION

The invention relates to a flow state sensor for detecting a flow state at a body that may be impinged on by a flow. In addition, the invention relates to a flow measuring device having a plurality of such flow state sensors, to a production method for the flow state sensor and the flow measuring device, and to a flow measuring method which may be carried out with such a flow state sensor.

BACKGROUND OF THE INVENTION

Studies of the flow state are important for the planning and design of aircraft and especially of wing profiles. As described in detail by M. Gad-el-Hak in "Flow Control: Passive, Active and Reactive Flow Management", Cambridge University Press, 2002, study of the flow state onto the wing in operation during cruising flight is desirable especially in the case of technologies for laminar flow control and hybrid laminar flow control. The objective here is to determine and locate the transition of the flow from the laminar state to the turbulent state.

On aircraft wings (or bodies in general around which air flows), a velocity boundary layer forms between the surface and the outer flow, which layer gives rise inter alia to the frictional resistance of the body. The boundary layer is initially laminar and low-resistance. Very small disturbances having a wave character (Tollmien-Schlichting waves) are intensified with increasing propagation in the boundary layer. They cause a transition to a turbulent boundary layer and thus to a greater resistance. The frequency of those disturbing waves depends on the fluid and the flow velocity. In wind tunnel tests they are typically between 10 Hz and 30 kHz. Intensive work is being done worldwide on moving that laminar-to-turbulent change—the transition—on wings and tailplanes to greater wing depths in order to reduce the friction drag thereof.

In that work or similar research and development projects in particular, it is important to obtain an exact determination of the transition in wind tunnel tests and in-flight tests in order in that manner to determine the effectiveness of new techniques and aircraft shapes for reducing friction drag.

In the prior art, arrays of different sensor types are used to measure the transition in wind tunnel tests and in-flight tests. For example, F. Hausmann: "Entwicklung einer Multisensor-Heißfilmtechnik zur Transitionserkennung im Reiseflug", Dissertation RWTH Aachen, 2004, describes the use of hot-film sensors, whereas in W. Nitsche, A. Brunn: "Strömungsmesstechnik", 2nd edition, Springer Verlag, 2006, the use of hot-wire anemometers, PVDF film sensors and microphones is proposed for that purpose.

All of those prior-art flow state sensors share the disadvantage of having a relatively elaborate configuration. A further disadvantage is that all of those sensors provide an analogue sensor signal, which requires laborious amplification of the signal, a high sampling rate and therefore extensive data collection and data evaluation in order for the decision to be made between "laminar" or "non-laminar" at the geometrical location of an individual sensor element. This is described in more detail in I. Peltzer: "Flug-und Windkanalexperimente zur räumlichen Entwicklung von Tollmien-Schlichting-Instabilitäten in einer Flügelgrenzschicht", Dissertation TU Berlin, 2004.

Hot-wire sensors and hot-film sensors moreover have a high energy consumption and require complex electronics and data evaluation. Particularly sensors with a thermal operating principle are in most cases operated in a closed control loop. For example, a constant temperature is set and, for example, the voltage necessary to maintain the constant temperature is measured and serves as the sensor signal. A comparatively large amount of power is required to operate such sensors.

U.S. Pat. No. 5,272,915 discloses an airflow sensing system in which a hot film sensor is driven by a constant voltage feedback circuit that maintains the voltage across the sensor at a predetermined level. Transitional airflow is distinguished from turbulent airflow by a signal having significant energy in a low-frequency passband from 50-80 Hz. A signal processing circuit drives a three-colour LED display to provide a visual indication of the type of airflow being sensed. A first problem with U.S. Pat. No. 5,272,915 is that a bandpass filter is required in order to sense the presence of energy in the 50-80 Hz passband. A second problem with U.S. Pat. No. 5,272,915 is that it cannot reliably detect a fully turbulent flow state which typically has a significant amount of energy with a frequency greater than 1 kHz.

Pressure sensors, which would also be capable in principle of determining a flow state at a body impinged on by a flow, are sensitive to vibrations and structure-borne sound and to temperature. In addition, they are not sufficiently sensitive for highly dynamic measurements, for example for establishing a transition at high oncoming flow velocities. Robust dynamic pressure sensors, which also have already been used in the field of flow measurement, do not in most cases have the required sensitivity to be used for transition measurements.

SUMMARY OF THE INVENTION

The object of the invention is to provide a flow state sensor of a simple construction and a simple flow measuring method for detecting flow states at a body impinged on by a flow.

That object is attained by a flow state sensor having the features of the accompanying claim 1, by a flow measuring device constructed therewith and having the features of the accompanying claim 18 and by a flow measuring method that can be carried out therewith, comprising the steps of the accompanying claim 23.

The subordinate claims relate to advantageous embodiments of the invention. The further independent claims relate to an advantageous production method for producing the flow state sensor and/or the flow measuring device and to a component that may be impinged on by a flow and that is provided with such a flow state sensor or such a flow measuring device.

The flow state sensor according to the invention is characterised by at least one frequency detecting device for detecting at least one predefined frequency that is characteristic of the flow state, wherein the frequency detecting device has at least one oscillation element excitable to resonant oscillatory movement by a flow and having a resonant frequency or natural frequency adapted to the predefined frequency characteristic, especially corresponding to the predefined frequency characteristic.

The advantages that can be gained with the construction according to the invention will be described in detail hereinafter.

The first sign of a change in the flow from the laminar to the turbulent state is the occurrence of instabilities at characteristic frequencies. Initial instabilities in the direction of the flow occur in the form of the Tollmien-Schlichting waves already mentioned above. Those characteristic waves propagate in the flow boundary layer. They possess typical frequencies that depend on the oncoming flow velocity.

At the transition, other/further coherent structures may also form in the flow with corresponding characteristic frequencies, for example lambda vortices or cross-flow structures, see in detail U. Knörnschild: "Untersuchungen zum laminar-turbulenten Transitionsprozess bei Anregung und Dämpfung schräglaufender Tollmien-Schlichting-Wellen", Dissertation TU Dresden, 2001.

A first aspect of the invention makes use of that finding and provides a flow state sensor that is sensitive to the occurrence of such typical frequencies. In that manner it is possible in particular—but not exclusively—to detect the presence of a laminar flow or the transition to a non-laminar state in an especially simple manner.

The flow state sensor according to the invention detects typical characteristics of the state of the flow directly.

According to another aspect of the invention, in order to detect a transition, for example, merely a differentiation is made as to whether the flow is laminar or already exhibits the first signs of a transition to the turbulent state, namely the formation of typical instabilities. In that case, no laborious data-processing is necessary since it is only a differentiation between two states that is being made.

Altogether, by means of the invention or its advantageous embodiments it is possible to obtain information on the flow state quickly and in a simple manner. The expenditure involved in data evaluation can be kept small.

It is generally possible to construct flow state sensors that have a very low energy requirement. The construction of flow state sensors that have no effect or only a very slight effect on the flow to be measured is also possible.

The flow state at bodies around which the flow passes can be characterised in a very simple manner with the measuring method according to the invention and the flow state sensor according to the invention. Coherent structures in the flow that have typical (characteristic) frequencies are detectable in a very simple manner, namely by direct detection of those frequencies. It is therefore also possible to detect, in particular, the transition between different flow states. For example, a transition is detectable in a simple manner, with the instabilities occurring at the time, e.g. Tollmien-Schlichting waves, being detected on the basis of their typical frequency.

Using advantageous embodiments of the flow state sensors according to the invention it is also possible to construct in a simple manner a flow measuring device suitable for arrangement on the surface of a body around which the flow passes, especially a component of an aircraft or an aircraft model, which flow measuring device spatially resolves the flow states. For this, an array of flow state sensors that are sensitive to at least one predefined frequency or that respond to only two different flow states is preferably provided. Such a flow measuring device is particularly suitable for use in in-flight tests.

For use in flight, an array of sensors that are as simple as possible is advantageous, each of which sensors needs to have in principle—for example for detecting the transition—only two states: laminar state at the location of the sensor (i.e. the flow is laminar, state "0") and non-laminar state at the location of the sensor (flow is non-laminar; state "1"). Owing to such a simple sensor output, even with a large number of sensors it is possible to achieve simple data evaluation for locating certain flow states. This works especially for all flow states that are associated with predefinable characteristic frequencies.

A small, discrete number of states is also possible, for example 1 for "laminar", 0 for "transition" and 1 for "completely turbulent". The flow state sensor is therefore preferably configured for the detection and digital output of exactly two flow states or a small number of discrete states (for example exactly three states, exactly four states).

The flow state sensor has at least one resonant sensor element or oscillation element that is excited to oscillation by the predefined frequency. The natural frequency or resonant frequency of the oscillation element is adapted to a typical characteristic frequency of a flow state that is to be determined. For example, the natural frequency is adapted to the frequency of the Tollmien-Schlichting waves, that is to say, for example, is equal to that frequency (or a harmonic thereof) or close to that frequency (or a harmonic thereof).

When a plurality of oscillation elements with differing natural frequencies are provided, it is possible on the one hand to detect differing flow states exhibiting differing characteristic frequencies. On the other hand, it is also possible to detect flow states whose typical frequencies vary as a result of certain parameters. For example, the oscillation elements could be adjusted to typical Tollmien-Schlichting waves at differing typical oncoming flow velocities. Furthermore, the states that occur could be characterised more precisely on the basis of the typical frequencies that occur.

In accordance with one advantageous development of the invention, the at least one oscillation element is excited to mechanical oscillation by a flow having the predefined frequency that is to be detected. The oscillation of the oscillation element can be detected by various known methods (e.g. capacitively or inductively). In an especially preferred manner, the mechanical oscillation energy is used to generate electrical energy. For example, the mechanical oscillation energy of a small oscillation element, for example in connection with a magnetic element, is sufficient to generate a small electrical and/or magnetic alternating field with which a bit of a memory element can be set. That bit can then be read out in a simple manner, preferably wirelessly.

The flow state sensor is thus able to operate independently, and its state can preferably be queried wirelessly. In that case, the flow state sensor does not require any electrical lines for supply and communication.

To produce the sensors, especially microengineering, more especially microsystem engineering or microproduction engineering, is suitable. Owing to the small dimensions of flow state sensors produced by microengineering, it is possible in particular to manufacture a flow measuring device having an array composed of a plurality of the flow state sensors, with which an exact spatial measurement is possible on the surface of the body onto or around which the flow passes. Production by microengineering furthermore offers the advantage that the flow state sensor can be made with a low height. That has advantages for integration of the flow state sensor or a flow measuring device formed from a plurality of such flow state sensors in a surface of a component, for example a wing of an aircraft or aircraft model.

In addition, oscillation characteristics of the frequency detecting device, especially the resonant frequency of the at least one oscillation element, can be adapted in a simple manner by microtechnology processes. On the one hand, the resonance can be adapted by way of the geometry of the frequency detecting device, especially the geometry of the oscillation element. In addition, there is the possibility of applying material in a specific manner by means of microtechnology in order to influence oscillation. For example, by applying thin layers, the mechanical stresses in an oscillation element of the flow state sensor and hence its oscillation characteristics can be influenced.

It is preferred that a damping device be provided for the specific purpose of decoupling the flow state sensor from external vibrations and structural oscillations which could interfere with frequency detection. With a suitable layout of the damping device, only the flow signal is detected.

As has already been mentioned above, in accordance with one advantageous embodiment of the invention there is the possibility of utilizing the energy generated by an oscillating structural element configured for resonant oscillations. In the case of resonant oscillation especially, that energy may be used to generate a signal that indicates that the flow is no longer laminar. It is only then that the resonant structure responds, since it is only then that the characteristic frequencies that excite the resonance are present. The energy generated by the response is sufficient, for example, to set a single bit in a memory.

BRIEF DESCRIPTION OF THE DRAWINGS

Illustrative embodiments of the invention will be described in detail hereinafter with reference to the accompanying drawings, in which.

DETAILED DESCRIPTION OF EMBODIMENT(S)

Figure 1:
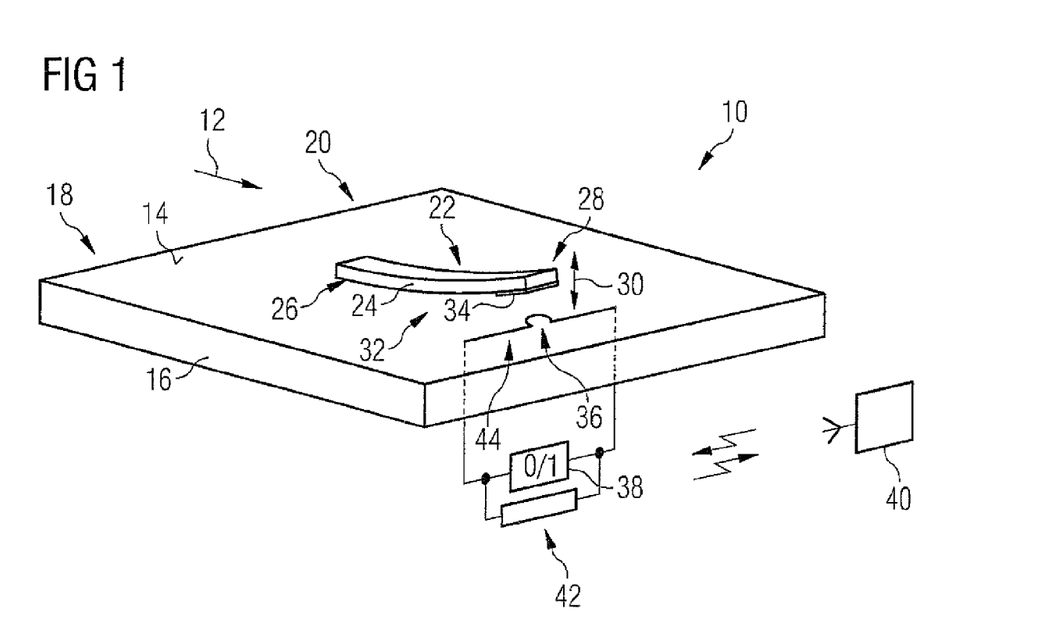
FIG. 1 is a schematic perspective elementary diagram of a first embodiment of a resonant flow state sensor.

FIG. 1 shows a first illustrative embodiment of a flow state sensor 10 on a surface 14 of a body 16 on which a flow 12 impinges. The body 16 is, for example, a component 18 of an aircraft around which the flow passes, especially a wing component (or a tailplane component or fuselage component), with which flight testing is carried out, or of an aircraft model used, for example, for wind tunnel tests.

The flow state sensor 10 has a frequency detecting device 20 for detecting a predefined frequency of the flow 12. The frequency detecting device 20 has a resonant element or oscillation element 22 capable of oscillating at a natural frequency that is adapted to the frequency to be detected. For that purpose, the oscillation element 22 in the example illustrated is elongate in form, typically with a length less than 2 mm. In the examples illustrated, the oscillation element 22 is a curved thin strip 24, bar or cantilever which is fixed at one end 26 and which oscillates up and down at the free end 28. When the frequency that is to be detected occurs, the free end 28 oscillates in a resonant oscillatory movement 30. Typically the oscillation element has a resonant frequency or natural frequency greater than 1 kHz. If the oscillation element is used in flight then the resonant frequency is preferably between 1 kHz and 10 kHz. If the oscillation element is used for wind tunnel testing then the resonant frequency may need to be higher, up to 30 kHz.

The oscillation element may be aligned with the airflow or pointing into the airflow. Alternatively it may be aligned at an angle to the airflow, either extending away from the surface 14 or parallel with the surface 14. In all cases the oscillatory movement of the oscillation element is a bending movement transverse to its length.

The oscillatory movement 30 can be detected by an energy generating device 32. The latter has, in the example of FIG. 1, a magnetic material at the free end 28, here in the form of a magnetic layer 34, and an electrical conductor 36 on the surface 14. The conductor 36 is configured such that the oscillatory movement 30 and the resultant relative movement of the magnetic material induces a voltage with which a bit of an attached memory element 38 can be set. That bit can then be wirelessly queried by an evaluation device 40.

The energy can be detected not only electromagnetically but also by other known means, for example piezoelectrically with a thin piezoelectric layer. The energy generating device 32 of a further embodiment, not shown, accordingly has a piezo element which converts the oscillatory movement into a form of energy suitable for setting the bit.

In the case of the first embodiment of the flow state sensor 10 illustrated in FIG. 1, the oscillation element 22 is mounted on the flow-impinged surface 14 of the body 16 around which the flow passes. The oscillation element 22 can thereby interface with the flow 12 in the optimum manner.

In that case, however, there is also the possibility that the oscillation element 22 will affect the flow 12 downstream of the oscillation element 22.

To avoid or reduce such an effect, an actuable damping unit 42 is provided by means of which the oscillation element is damped in its oscillatory movement or held completely fixed by external actuation. In one embodiment illustrated herein, the damping unit 42 utilizes the above-mentioned elements 34, 36 of the energy generating device 32. For example, by applying a voltage to the conductor 36, a magnetic field is produced which acts on the magnetic layer for damping or fixing purposes. By means of the damping unit 42 it is possible to prevent potential influencing of the flow by further oscillations of the oscillation element 22 after the oscillation element 22 has responded.

Alternatively or in addition, a limiting device 44 is provided by means of which the amplitude of the oscillation in the case of resonance is limited to an extent such that the effect on the flow 12 is negligible. The limiting device 44 is formed, for example, by a stop for the free end 28. In the example illustrated, the stop is formed simply by the surface 14, with the strip 24 being in a form such that, starting at a certain oscillation amplitude that is not yet sufficient to cause a significant effect on the flow 12, the free end 28 is stopped against the surface 14.

Figure 2:
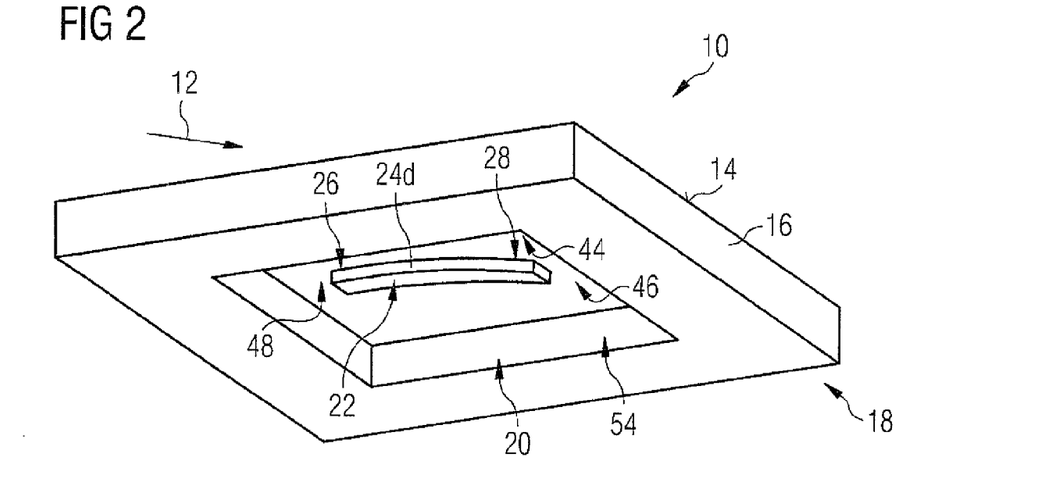
FIG. 2 is a schematic perspective elementary diagram of a second embodiment of a resonant flow state sensor.

In FIG. 2, a second embodiment of the flow state sensor 10 is illustrated. The same reference numerals are used for corresponding parts. To provide better protection for the flow state sensor 10 against external environmental conditions, a resonant sensor element, especially the at least one oscillation element 22, is disposed on that side 46 of a diaphragm 48 which faces away from the flow. The oscillation element 22 is in this case configured as a multilayer strip 24 consisting of a plurality of layers that have been appropriately configured during production to set the natural frequency.

Figure 3:
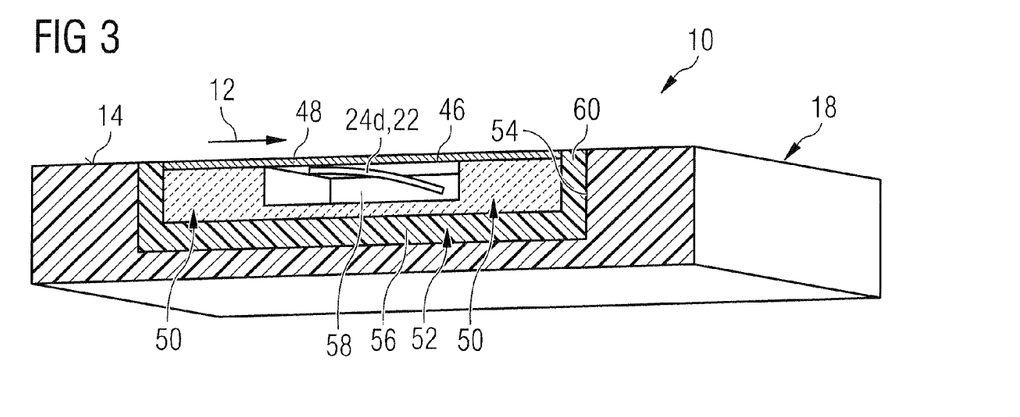
FIG. 3 is a schematic sectional view of a flow state sensor according to the second embodiment of FIG. 2, used in a component around which the flow passes.

FIG. 3 shows the flow state sensor 10 in accordance with the second embodiment, built into the component 18. The flow state sensor 10 has a housing 50 which as regards oscillation is decoupled from the component 18 by means of a damping device 52. The damping device 52 together with the housing 50 is built into a cavity 54 in the component 18 and has a damping layer 56 and a damping material 60 that effectively damp structural oscillations and vibrations of the component 18.

Disposed in a hollow space 58 inside the housing 50, which space 58 is covered off from the flow 12 by the diaphragm 48, there is the oscillation element 22, which is thus protected very well from environmental influences. In this case also, the oscillation element 22 is in the form of a multilayer strip 24d. The oscillation characteristics of the strip 24d can be influenced by the configuration of a plurality of layers of the strip 24d.

In operation, the diaphragm 48 is excited by the flow 12 to oscillations which are transmitted to the oscillation element 22 by air pressure fluctuations within the cavity 54. When the predefined frequency occurs, resonance occurs which, in a manner similar to that described above for the first illustrative embodiment, is detected and passed to the evaluation device 40.

The encapsulated variant of the flow state sensor 10 illustrated in FIGS. 2 and 3 offers the additional advantage that the flow 12 is not further excited by the oscillating oscillation element 22 or the flow state is not altered.

In an especially preferred embodiment, the resonant frequency of the diaphragm 48 is adapted to the resonant frequency of the oscillation element 22 which in this case is in the form of a strip 24d.

At any event, the diaphragm 48 is configured such that its movement affects the flow 12 as little as possible or not at all, but the attached oscillation element 22 is excited.

The location where the oscillation element 22 is provided is predetermined as exactly as possible in accordance with the need to guarantee maximum transmission of the oscillations to be measured or of the frequencies to be measured. The location may depend on the particular frequency to be measured. Advantageously, prior to production, simulation calculations of the oscillation modes of the diaphragm 48 are to be carried out for this to determine the location of maximum transmission for the particular desired predefined frequency.

The hollow space 58 in which the sensor element—here the strip 24, 24d—is situated may also be adapted by its dimensions to the desired resonant frequency. The special housing 50 serves to provide the desired hollow space 58 having suitable oscillation or acoustic characteristics.

The damping device 52 has damping material 60 between the housing 50 and the flexible diaphragm 48, which prevents structural oscillations from being transmitted to the diaphragm 48 and the resonant oscillation element 22 and thereby falsifying the measurement result. Equally, the housing 50 itself may be constructed by suitable structuring or by means of the above-mentioned damping layer 56 in such a way that as far as possible no vibrations are transmitted to the sensor element 22.

Figure 4:
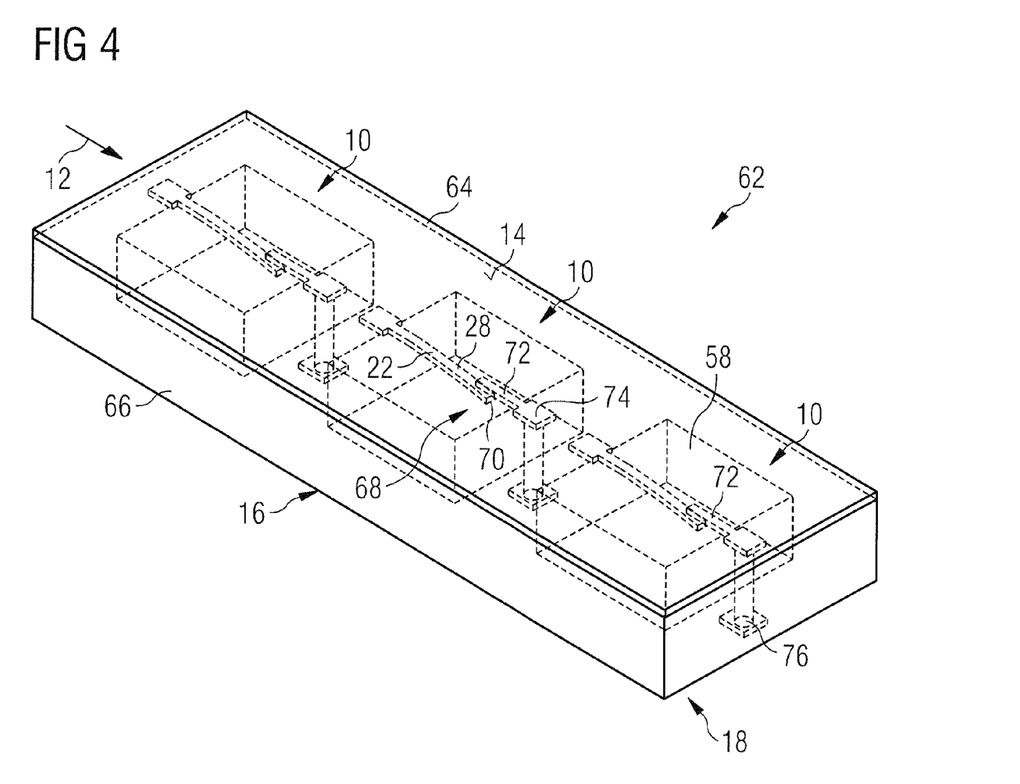
FIG. 4 is a schematic elementary illustration of a flow measuring device composed of a plurality of the flow state sensors of FIG. 3, built into a component around which the flow passes.
Figure 5:
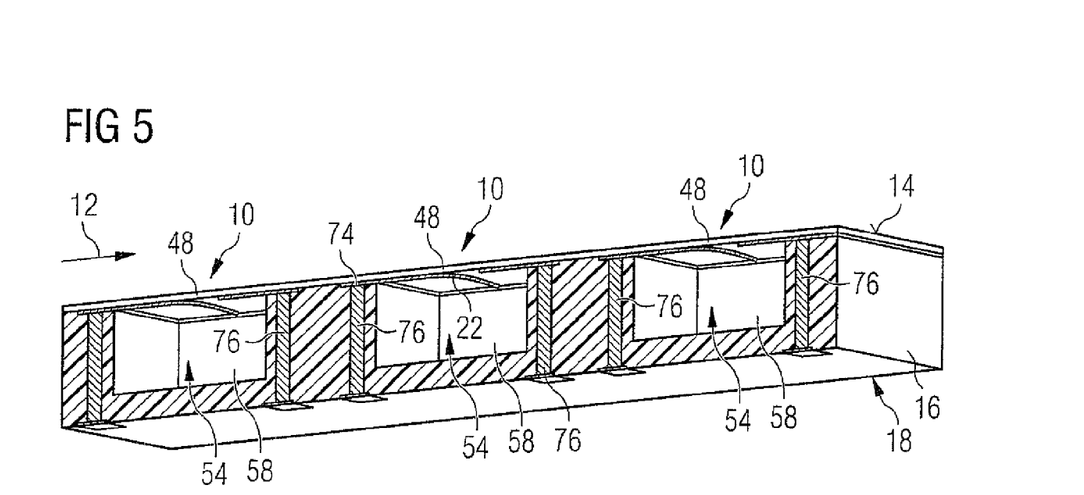
FIG. 5 shows a longitudinal section through the flow measuring device shown in FIG. 4.

In FIGS. 4 and 5, a flow measuring device 62 composed of a plurality of the flow state sensors 10 is illustrated. The flow measuring device 62 has an array of flow state sensors 10 arranged in a defined spatial distribution in order to detect a laminar flow state or non-laminar flow state at the location of the respective flow state sensor 10. The flow measuring device is integrated in the surface 14 of the component 18.

The flow state sensors 10 of the flow measuring device 62 are preferably manufactured together by microproduction engineering. For this, the flow measuring device 62 is formed from two substrates 64 and 66 which are joined to each other.

The first substrate 64 is formed especially from semiconductor material, such as silicon, or a polymer film. The flexible diaphragms 48 having the resonant oscillation elements 22 including a read-out mechanism 68 and the associated terminals 74 are produced on the first substrate 64.

The possibility of producing a resonant sensor in or on a preferably thin, flexible substrate such as, for example, a polymer film is of great advantage for application to, for example, a wing, since the sensor can in that manner be retrofitted to the component, for example the aircraft, and in wind tunnel tests can be fitted to models without the necessity to adapt the models.

The read-out mechanism 68 is configured for capacitive read-out in the example illustrated herein. For that purpose, the strip 24, 24d has at least one layer of electrically conductive material 70 or is formed of such a material. The free end 28 overlaps a fixed conductor blade 72. In that manner, a capacitor is formed, the capacitance of which changes with the distance between conductor blade 72 and conductive material at the free end 28. It is therefore possible to detect the oscillatory movement 30 by measuring or determining a change in capacitance.

The cavities 54 or hollow spaces 58 and through-plated holes 76 are made in the second substrate 68 and the electrical terminals 74 and lines are connected.

The two substrates 64, 66 are then joined together in an exact fit by means of an adhesive bond.

During production, the oscillation elements 22 are provided with a predefined natural frequency. Changes to the natural frequency may be made by applying or removing material and/or by changing the shape and/or the dimensions of the oscillation elements 22. The natural frequencies are adapted to the frequencies of the Tollmien-Schlichting waves to be expected in the respective measurements that are to be carried out on the component 18 by the flow state sensors 10 in such a way that those frequencies excite resonance oscillations.

Figure 6:
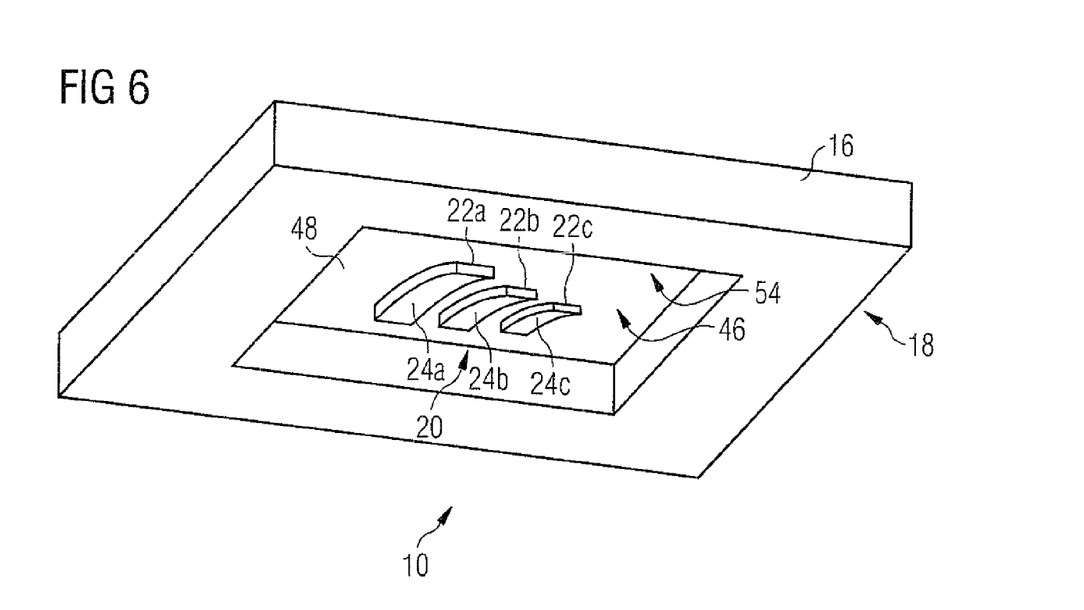
FIG. 6 is a schematic perspective elementary diagram of a third embodiment of a resonant flow state sensor.

In FIG. 6, a third embodiment of the flow state sensor 10 is also illustrated. The third embodiment differs from the second embodiment in that the frequency detecting device 20 has a plurality of oscillation elements 22a, 22b, 22c, similarly in the form of strips 24a, 24b, 24c here, which have differing natural frequencies. The frequency detecting device 20 is accordingly sensitive to a plurality of differing resonant frequencies. In that manner, a more exact characterisation of the typical frequencies may be carried out.

In general, the occurrence of frequencies characteristic of certain types of flow state can be detected by the flow state sensors 10 illustrated in the Figures. The output of the flow state sensor is digital, namely "1" for the presence of the frequency and thus of the flow state to be detected and "0" for the absence. Since only two states have to be evaluated in the case of this sensor type, the equipment of the evaluation device 40 may be extremely simple. The amount of data to be transferred is very small and therefore wireless communication can be carried out using simple means. The sensor type described herein therefore offers a distinct advantage over existing flow state sensors used hitherto for the determination of a transition.

The flow state sensor 10 described herein is suitable for the detection of flows in all fluids. A preferred application is the detection of flows in air, especially in connection with aircraft. The flow state sensor 10 may, however, also be used, for example, for water etc., for example in connection with moving bodies in water (ships etc.).

Although the invention has been described above with reference to one or more preferred embodiments, it will be appreciated that various changes or modifications may be made without departing from the scope of the invention as defined in the appended claims.

LIST OF REFERENCE NUMERALS 10 flow state sensor
12 flow
14 surface
16 body
18 component
20 frequency detecting device
22 oscillation element
22a first oscillation element
22b second oscillation element
22c third oscillation element
24 strip
24a first strip
24b second strip
24c third strip
24d multilayer strip
26 fixed end
28 free end
30 oscillatory movement
32 energy generating device
34 magnetic layer
36 conductor
38 memory element
40 evaluation device
42 controllable damping unit
44 limiting device
46 side facing away from the flow
48 flexible diaphragm
50 housing
52 damping device
54 cavity
56 damping layer
58 hollow space
60 damping material
62 flow measuring device
64 first substrate (flexible diaphragm)
66 second substrate (support material)
68 read-out mechanism
70 electrically conductive material
72 conductor blade
74 terminals
76 through-plated holes

| List of reference numerals | |
|---|---|
| 10 | flow state sensor |
| 12 | flow |
| 14 | surface |
| 16 | body |
| 18 | component |
| 20 | frequency detecting device |
| 22 | oscillation element |
| 22a | first oscillation element |
| 22b | second oscillation element |
| 22c | third oscillation element |
| 24 | strip |
| 24a | first strip |
| 24b | second strip |
| 24c | third strip |
| 24d | multilayer strip |
| 26 | fixed end |
| 28 | free end |
| 30 | oscillatory movement |
| 32 | energy generating device |
| 34 | magnetic layer |
| 36 | conductor |
| 38 | memory element |
| 40 | evaluation device |
| 42 | controllable damping unit |
| 44 | limiting device |
| 46 | side facing away from the flow |
| 48 | flexible diaphragm |
| 50 | housing |
| 52 | damping device |
| 54 | cavity |
| 56 | damping layer |
| 58 | hollow space |
| 60 | damping material |
| 62 | flow measuring device |
| 64 | first substrate (flexible diaphragm) |
| 66 | second substrate (support material) |
| 68 | read-out mechanism |
| 70 | electrically conductive material |
| 72 | conductor blade |
| 74 | terminals |
| 76 | through-plated holes |

The invention claimed is:

1. A flow state sensor for detecting a flow state of a fluid flow at a body, said flow state sensor comprising:
at least one frequency detecting device for detecting at least one predefined frequency characteristic of the flow state, wherein the frequency detecting device comprises at least one oscillation element excitable to resonant oscillatory movement by said flow and having a resonant frequency adapted to the at least one predefined frequency characteristic, wherein the resonant oscillatory movement of the oscillation element is a bending movement in a direction transverse to a length of the oscillation element;
a readout mechanism configured to provide an output indicative of said oscillatory bending movement of said element; and
an evaluation device, responsive to said readout mechanism output, to indicate the flow state of said fluid flow.

2. A flow state sensor according to claim 1, wherein a plurality of oscillation elements having differing resonant frequencies are provided for detecting a plurality of discrete characteristic frequencies.

3. A flow state sensor according to claim 1, wherein the at least one oscillation element is provided on a flexible film- or sheet-form substrate.

4. A flow state sensor according to claim 1, wherein the at least one oscillation element is configured for mounting on a surface of the body that may be impinged on by the flow, which surface is exposed to the flow.

5. A flow state sensor according to claim 1, wherein a diaphragm is provided which may be impinged on by the flow and which is connected to or is part of the frequency detecting device for detecting oscillations excited by the flow.

6. A flow state sensor according to claim 5, wherein the at least one oscillation element is connected to or disposed on a side of the diaphragm which faces away from the flow.

7. A flow state sensor according to claim 1, further including a controllable damping unit for controlled damping or fixing of the at least one oscillation element or by a limiting device for limiting an oscillation amplitude of the at least one oscillation element.

8. A flow state sensor according to claim 1, wherein the frequency detecting device has an energy generating device for converting mechanical oscillation energy excited by the predefined frequency into electrically energy.

9. A flow state sensor according to claim 8, wherein the oscillation energy generates an electrical signal for indicating a non-laminar flow state.

10. A flow state sensor according to claim 8, further including a memory element having at least one bit whose state can be altered by the energy generating device is provided.

11. A flow state sensor according to claim 1, further including a wireless connection between said evaluation device and said readout mechanism for read-out purposes.

12. A flow state sensor according to claim 1, further including a damping device for reducing or avoiding transmission of oscillations from the body to the frequency detecting device.

13. A flow state sensor according to claim 1, wherein the at least one oscillation element has a resonant frequency which is greater than 1 kHz and less than 10 kHz.

14. A flow state sensor according to claim 1, wherein the at least one oscillation element is elongate in form, fixed at one end, and has a free end which can oscillate in a resonant oscillatory movement.

15. A flow state sensor according to claim 14 wherein the at least one oscillation element has a length less than 2 mm.

16. A flow state sensor according to claim 1, further comprising means for detecting the resonant oscillatory movement of the at least one oscillation element and generating an output which is indicative of the presence of the flow state at the body on detection of the resonant oscillatory movement.

17. A flow measuring device for detecting flow states at a body impinged on by a flow, including an array composed of a plurality of flow state sensors according to claim 1, for detecting flow states in a spatially resolved manner at a plurality of measuring points spaced from one another on the body impinged on by the flow.

18. A component that may be impinged on by a flow, especially an aircraft or an aircraft model for wind tunnel tests, including a flow state sensor according to claim 1 is provided on or in a surface of the component, which surface may be impinged on by the flow.

19. A production method for the production of a flow state sensor according to claim 1, including the step of microengineering production of at least the frequency detecting device.

20. A production method according to claim 19, wherein the frequency detecting device is produced on a flexible sheet-form substrate.

21. A production method according to claim 19, wherein the oscillation characteristics of a mechanical oscillation element of the frequency detecting device are set by
adapting the geometry of the oscillation element or
applying at least one layer of material to the oscillation element.

22. A measuring method for detecting a flow state at a body that may be impinged on by a flow, including the step of providing at least one flow state sensor according to claim 1 for detecting two flow states, namely a laminar state, in which the flow is laminar, and a non-laminar state, in which the flow is non-laminar.

23. A measuring method according to claim 22, wherein the frequency detecting device is set to detect a frequency typical of a non-laminar flow state and that, on detection of the typical frequency, the non-laminar flow state is determined and, on non-detection of the typical frequency, the laminar flow state is determined.

24. A measuring method according to claim 22, wherein the non-laminar flow state is a fully turbulent flow state.

25. A measuring method according to claim 22, further comprising the step of detecting the resonant oscillatory movement of the oscillation element and generating an output which is indicative of the presence of the non-laminar flow state at the body on detection of the resonant oscillatory movement.

26. A flow state sensor for detecting laminar and non-laminar flow states of a fluid flow at a body, said flow state sensor comprising:
at least one oscillation element mounted on said body, said element resonant at a frequency indicative of laminar flow on said body;
a readout mechanism configured to provide an output indicative of said element vibrating at said resonant frequency; and
an evaluation device, responsive to said readout mechanism output, to indicate a laminar flow state of said fluid flow.

* * * * *